United States Patent
Zeck et al.

(10) Patent No.: US 6,956,676 B2
(45) Date of Patent: Oct. 18, 2005

(54) METHODS AND SYSTEMS FOR PROVIDING HALFTONE SCREENS

(75) Inventors: Norman W. Zeck, Webster, NY (US); Peter A. Crean, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 528 days.

(21) Appl. No.: 09/683,418

(22) Filed: Dec. 26, 2001

(65) Prior Publication Data

US 2002/0085232 A1  Jul. 4, 2002

Related U.S. Application Data

(60) Provisional application No. 60/258,326, filed on Dec. 28, 2000.

(51) Int. Cl.$^7$ .......................... G06K 15/00; H04N 1/40

(52) U.S. Cl. ...................... 358/3.19; 358/3.03; 358/1.9

(58) Field of Search .............................. 358/3.07–3.09, 358/3.13–3.14, 3.16–3.17, 3.19, 3.2, 3.23, 358/1.9; 382/237

(56) References Cited

U.S. PATENT DOCUMENTS

| | | | |
|---|---|---|---|
| 4,149,194 A * | 4/1979 | Holladay | 358/3.23 |
| 4,185,304 A * | 1/1980 | Holladay | 358/3.2 |
| 5,200,831 A * | 4/1993 | Tai | 358/3.14 |
| 5,410,414 A * | 4/1995 | Curry | 358/3.23 |
| 5,625,460 A * | 4/1997 | Tai | 358/3.14 |
| 5,696,604 A * | 12/1997 | Curry | 358/3.02 |
| 5,701,366 A * | 12/1997 | Ostromoukhov et al. | 382/237 |
| 5,729,632 A * | 3/1998 | Tai | 382/237 |
| 5,745,249 A * | 4/1998 | Crean et al. | 358/3.06 |
| 5,859,955 A * | 1/1999 | Wang | 358/1.9 |
| 6,512,597 B1 * | 1/2003 | Cooper et al. | 358/1.9 |

* cited by examiner

*Primary Examiner*—Thomas D. Lee
*Assistant Examiner*—James A Thompson
(74) *Attorney, Agent, or Firm*—Oliff & Berridge PLC

(57) ABSTRACT

Halftone generating methods and systems convert continuous tone anti-aliased image data to halftone image data using halftoning techniques that efficiently use memory resources. One of a plurality of Holladay counters is selected and the address bits from the selected Holladay counter are output to a look-up table that efficiently stores various halftone screens. Halftone image data is then output. If necessary, the halftone image data is unpacked and replicated as required depending on the resolution requirements of the halftone screen.

13 Claims, 7 Drawing Sheets

# METHODS AND SYSTEMS FOR PROVIDING HALFTONE SCREENS

BACKGROUND OF THE INVENTION

1. Field of Invention

This invention relates to methods and systems for image rendering using digital halftoning.

2. Description of Related Art

Because various image rendering systems, such as copiers and printers, are not suited to directly reproduce the variety of intensity levels present in a continuous tone (contone) image, digital halftoning techniques are used to render intensity or lightness levels, by converting the continuous tone image to a halftone image. A halftone representation is an approximation of an original image that uses a series of carefully placed dots of various sizes and/or patterns that, when viewed from a distance, creates an illusion of continuous tones.

Generally, the dot area or halftone screen size is desirably small to create the illusion of a continuous tone. However, if the screen size is too small, various image artifacts, such as false contours, appear in the halftone image that do not exist in the original continuous tone image.

If the screen size of a rendering system is increased, the rendering system can produce more gray levels that better represent smoothly varying regions. However, increasing the screen size results in a coarser halftone screen which is less able to represent fine details of the original image. Since a halftone screen cannot simultaneously be both very large and very small, a rendering system must choose between screens of varying sizes according to the image characteristics of the image to be reproduced. However, storing various screens for a variety of screen sizes and types can use a significant amount of memory.

SUMMARY OF THE INVENTION

Accordingly, systems and methods that render halftone images which can select between screens of various sizes while simultaneously maintaining modest memory requirements are desirable.

This invention provides methods and systems that convert continuous tone (contone) image data to a halftone image data, that efficiently use memory resources.

This invention provides systems and methods that allow the choice of memory utilization and binary pixel addressability in a system that can support both periodic and pseudo-random, or stochastic, halftone screens to be efficiently controlled.

In various exemplary embodiments of the systems and methods according to this invention, a direct mapped halftoning system includes an input device that receives continuous tone image data, one or more memory address sequencers, or "Holladay counters", having varying resolutions, and a selection device that selects one of the memory address sequencers, or "Holladay counters", along with a respective halftone screen. A look-up table containing the respective halftone screen is addressed using the selected memory address sequencer, or "Holladay counter", and the continuous tone image data to produce halftone image data. The memory address sequencers or Holladay counter is described in greater detail in U.S. Pat. No. 5,745,249 incorporated herein by reference in its entirety.

Because stochastic halftone screens require less resolution than clustered-dot halftone screens, the look-up table can store stochastic halftone screens in a packed format. Thus, if a stochastic halftone screen is used, a digital logic device selects a subset of the packed halftone data, replicates the selected subset, and outputs the replicated image data as the byte-wise halftone image data. Otherwise, the digital logic will simply pass the halftone image data provided by the look-up table without altering it.

In various other exemplary embodiments of the systems and methods according to this invention, a multi-resolution threshold halftoning system includes an input device that receives continuous tone image data, one or more memory address sequencers, or "Holladay counters", having varying resolution, and a selection device that selects one of the memory address sequencers, or "Holladay counters", along with a respective halftone screen. A threshold look-up table containing the selected threshold halftone screen is addressed using the selected memory address sequencer, or "Holladay counter". The output of the threshold look-up table is compared to the continuous tone image data to produce halftone image data. A digital logic device can then pass the halftone image data unaltered or optionally extract a subset of the halftone image data, replicate it, and output the replicated image data.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
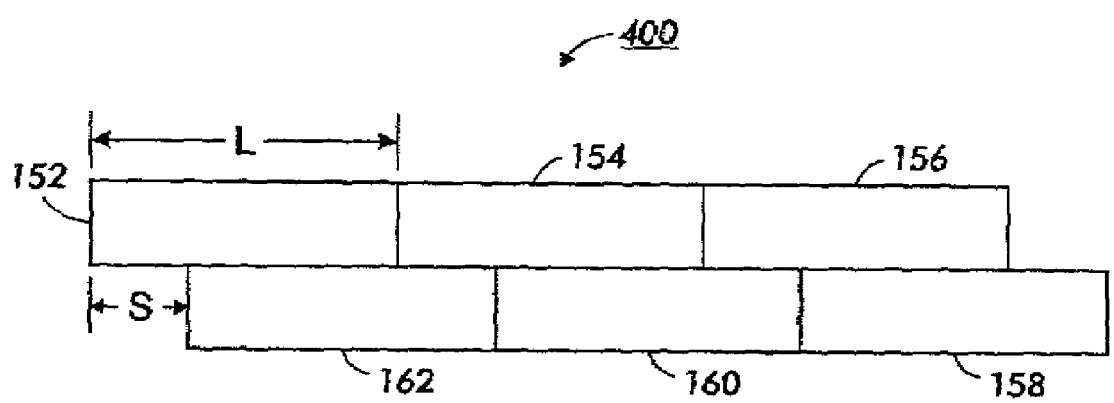
FIG. 1 is a diagram that shows the relationship of the Holladay brick parameters.

As indicated above, various image rendering systems, such as copiers and printers, that are not suited to directly reproducing the variety of intensity levels present in a continuous tone (contone) image, use digital halftoning techniques to render intensity or lightness levels. A halftone representation is an approximation of an original image that uses series of carefully placed dots of various sizes that, when viewed from a distance, creates an illusion of continuous tones. In this way, different intensity levels are perceived by the human visual system depending on the number and size of the dots that are printed. This technique can be used in both monochromatic devices, where only luminance is represented, and in color devices, where both luminance and color are represented.

In general, there is a design trade-off in the number of intensity levels that can be represented and the halftone screen frequency. The halftone screen frequency is usually given in terms of the number of halftone dots per unit of measure. Larger halftone dots, which have more binary pixels to control and can represent more intensity levels, result in a lower halftone screen frequency. If the halftone screen frequency is high, edges will be rendered more accurately, but fewer intensity levels can be represented since the dot size is small. As a result, false contours in the output image are introduced that are objectionable in terms of image quality.

However, if the halftone dot size of a rendering system is increased, the rendering system can produce more intensity levels that can better represent smoothly varying regions. Unfortunately, increasing the halftone dot size results in a lower frequency halftone screen, i.e., a coarser halftone screen, that is less able to represent the fine details of the original image.

Since a halftone screen cannot simultaneously be both very large and very small, a rendering system must choose between screens of varying sizes according to the image characteristics of the image to be reproduced. However, storing various screens for a variety of screen sizes and types can use a significant amount of memory, which can prohibitively raise the cost of an image rendering device, such as a printer.

This description refers to a halftone screen that has a periodic repetition or "dot frequency". Another type of screen, stochastic screens, are used to overcome some of the deficiencies of the traditional periodic halftone screens. Ideally, in stochastic screens, the binary dots are distributed in a random pattern. This pattern is chosen to represent a particular intensity level as perceived by the human visual system. The advantage of this approach is that there is no requirement for a periodic repetition of a dot, which can otherwise lead to aliasing of edges found at low halftone frequencies. Thus, stochastic screens can give better edge rendering. Stochastic screens are also able to yield large numbers of intensity levels.

However, since it can be expensive to generate a truly random pattern, stochastic screens are often generated using a pseudo-random pattern that repeats at a very low spatial frequency. By using a pseudo-random pattern, as opposed to a truly random pattern, the large memory requirements are reduced. However, to achieve this low spatial frequency requires a large memory to store the large spatial context required to generate the binary pattern.

Fortunately, since the pattern is both pseudo-random and covers a large area, it is not necessary to have as fine an addressability and resolution as with dot screens. In some marking processes, single high resolution binary pixels may not be very stable and are often undesirable. As such, the fine addressability that is required in periodic halftone screens to both control dot frequency and generation of intensity levels is not generally required in stochastic screens.

It should be appreciated that the memory requirements of an image rendering device can be reduced even further by strategically configuring a number of Holladay counters directed to various clustered dot and stochastic screens, and selectively multiplexing the outputs of these Holladay counters to a single memory device, such as for example, a look-up table, so that various screens can generated with varying resolutions. Accordingly, continuous tone image data can be efficiently used to produce halftone image data using fewer circuit elements.

The continuous tone image data of a document may be generated in a number of ways, such as scanning the document using an optical scanner or rendering in a printer controller the continuous tone image data from a description of the document in a page description language, such as PostScript. The raster format may also include anti-aliased rendering as well. In any case, the ultimate goal is to accurately represent using halftones this document on a device that can not directly render continuous tone levels.

Various exemplary embodiments of the systems and methods of this invention include a memory address sequencer, also referred to herein as a "Holladay counter", that is used to address the memory that stores either thresholded binary halftone dots or the threshold arrays. The memory address sequencer, or Holladay counter allows a rectangular brick, conventionally known as a Holladay brick, defined by three parameters: length L, height P, and shift S, to be sequenced. The Holladay brick can be viewed as having P rows and L columns. The columns correspond to pixels in a raster ordered system and the rows correspond to scan lines. The shift parameter S is the amount to offset the rectangular Holladay brick at each repeat of P rows.

FIG. 1 illustrates how stacking Holladay bricks can be used to efficiently implement halftone screens. The memory address sequencer, or Holladay counter, sequences the memory by loading an offset value to start the memory sequence. This offset value is a {row, column} index into the brick to align the brick to the page. Next, the memory address sequencer, or Holladay counter, counts along a row to a value that is the end of the brick of width L. Then, the memory address sequencer, or Holladay counter, resets back to the beginning of the brick.

The memory address sequencer, or Holladay counter, repeats this counting for the row span "L" memory address values for the length of the brick for the rest of the scan line, repeating at "L" intervals. Then, at the next scanline, the memory address sequencer, or Holladay counter, recomputes the offset to index into the Holladay brick in the row direction one more row. Next, the counting, resetting and repeating, steps are themselves repeated for the scanline. Then, when the height P of the brick is completed, the memory address sequencer, or Holladay counter, shifts the Holladay brick by S, which will result in a new set of starting {row, column} offsets. Finally, the memory address sequencer, or Holladay counter, repeats these steps until the page is completed.

The threshold values for pixel locations within a brick are compared with the continuous tone level of the current pixel and the output binary pixel is set (on) or cleared (off) based on this comparison. The process for halftoning a digital image consists of comparing threshold values in the pixel locations within a brick with the continuous tone pixel values and then indexing to the next pixel location in the brick. Each row in the brick is used for a separate scanline or raster line of the binary output. Thus, for each output scanline, the next row of thresholds within the brick is used. After the last row of the brick is used, the comparison process begins anew with the top row of the brick. In general, the process can be represented as after P rows or lines of pixels have been processed, the set of bricks extending along the scanline are shifted down P rows and along the scanline by S columns and the process is repeated. The shift along the scanline is done modulo the length of the brick L. The modulus function requires a division, while the remainder is used as a start index into a row of the brick.

Many digital halftone systems describe the dot as a threshold array. This generates monotonic dots, where a higher density pattern uses all the pixels turned on by all lower density dots. In other words, once a dot is turned on, it stays on. This dot progression has advantages, but the freedom to turn dots on as well as off in a density progression has advantages including smoother constant colors. A pattern dot halftoning process, on the other hand, stores unique patterns for each density level and inserts a particular unique pattern into the pixel stream in response to an incoming continuous tone pixel value. These patterns may be filled in a monotonic, non-monotonic, pseudo-stochastic or other manner. Moreover, in high addressability printing engines, each incoming pixel controls the output level of a plurality of adjacent printable pixels.

A further distinction between halftoning using threshold dots and patterned dots is that, in thresholded dot halftoning, a value is stored for each output pixel. This requires that, several decisions be made for each outgoing pixel. Conversely, in the patterned dot halftoning process, a single decision is made. As a result, the string of pixels corresponding to the requested density is fetched or retrieved in a single operation. The use of patterned dots for halftoning is known. For example, the PostScript interpreter, available from Adobe, Inc., uses pattern dots for performance reasons, even when the dot function is described by some type of threshold function.

Pipelining is a digital architecture design technique where the execution speed of various operations is improved by breaking the operations into several simpler steps which can be executed in an overlapped sequence, rather than singly and sequentially. It should be appreciated that a certain degree of independence of the operations is required to allow pipelining within an image processing system. In contrast, in a super-scalar architecture, different operations are executed in parallel in distinct hardware when the operations are independent, i.e. when neither operation depends on the outcome of the other operation.

A key to this technique is reducing the complexity of the general Holladay halftoning algorithm to a series of easy-to-implement functional blocks. By choice of the data that is coded into the memory block and the block index parameters that are precomputed, the complexity of the implementation is greatly reduced. Further, choice of the memory coding and use of the continuous tone pixel as an input to the memory block allows multiple continuous tone pixels to be halftoned in parallel. In addition, multiple pixels at the device resolution can be generated to produce a plurality of output signals for what is often referred to high addressable pixels.

Such an approach is particularly efficient when the halftone design has a number of levels approaching the number of levels resolved by the continuous tone pixel value. It is very simple in gate count and complexity. Dots with different angles or frequencies require individual Holladay sequencers. A Holladay sequencer outputs a unique set of numbers which uniquely identifies the relative cell in the respective dot, but are otherwise constrained. Changing sequencers switches between dots to support the requirements of, for example, process controls, customer selection, and/or object optimized rendering. However, while requiring different sequencers, these dots can efficiently share a common memory.

For purposes of the following description the output resolution will be given in terms of a scale relative to the input resolution. For example, output= {4.times., 1.times.} means the fast scan resolution, corresponding to pixels, is 4 times the input resolution while the slow scan resolution, corresponding to scanlines, is one times the input resolution.

Figure 3:
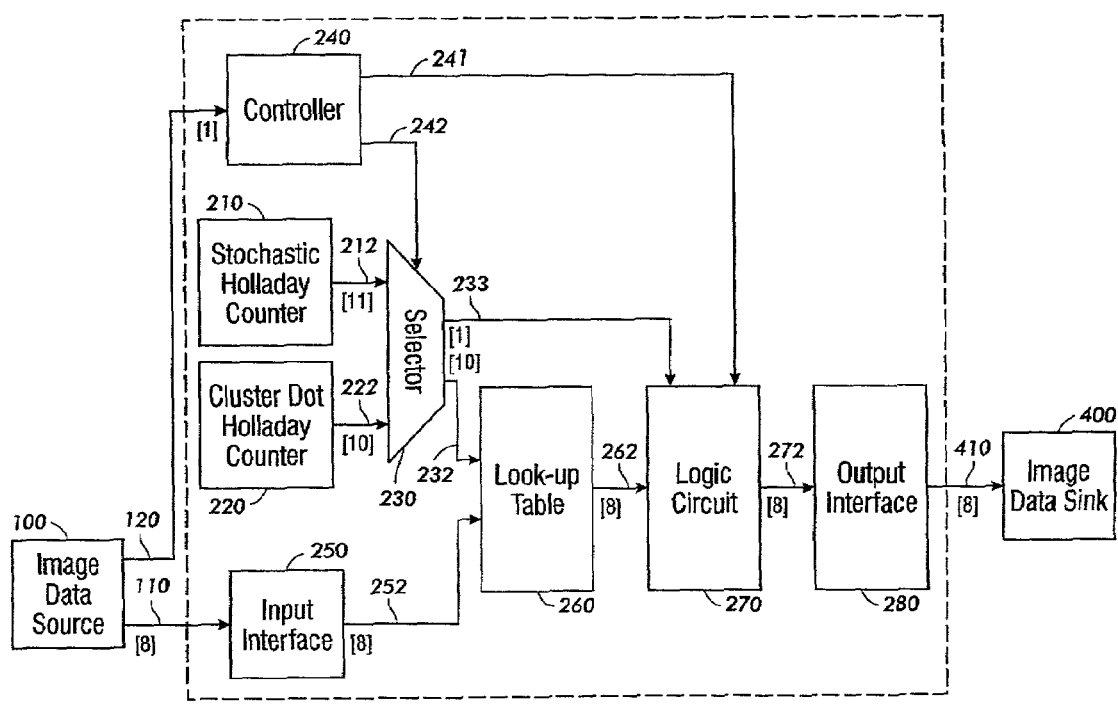
FIG. 3 is a block diagram showing in greater detail a first exemplary embodiment of the image processing system of FIG. 1.

The Holladay sequencer 210 or 220 shown in FIG. 3 indexes into the look-up table 260 shown in FIG. 3 to sequence through the halftone dot and maintain the phase and repeat frequency. The functional requirements of the Holladay sequencers 210 and 220 are that they be able to initialize at the beginning of a scanline, start at an offset location in memory representing an offset within the brick, count to an end location and reset back to a start location. In various exemplary embodiments, as described and shown in the incorporated '429 patent, a Holladay sequencer includes a first circuit that determines the brick index parameters. The determined brick parameters, such as, for example, the offset within the brick, are then fed to a dot address sequencer, where the initial and subsequent Holladay address components are generated for each pixel. The start-to-end counting sequence is repeated until the end of the scanline is reached.

At the end of a scanline, but before processing the next scanline, the offset, start, and end control parameters are updated within control registers of the Holladay sequencer from the determined brick index parameters. These parameters are a circular sequence of {offset, start, end} control parameters. The parameters are derived from the Holladay brick length (L), height (P), and shift (S), illustrated in FIG. 1, but are different in that these parameters reflect the coding of the halftone dot in memory. For example, the length of the count sequence will, at a maximum, equal to L. In some cases, depending on the value of L and the binary output resolution, this count may be shorter. For example, {L=16, output-{8.times.,1,}} will require only two locations in memory. That is, the count sequence length is equal to 2. It should be appreciated that, in the above example, there may be more total memory locations required within the look-up table 260, depending on the magnitude of S and P, but that the count on any given row will remain at two.

As a practical note, in some cases, the row will only take up one memory location. However, in certain situations the digital pipeline delays may not make it efficient, or even possible, to address only one memory location and repeat the addressing sequence for only that one location. In this case, the code may simply be replicated in memory and the count increased to improve performance.

Lastly, at a point where the brick starts at the beginning of the scan line, back in phase with the first scan line, the parameter sequence repeats. Furthermore, there may be different implementations of these control parameters such as {offset start, length offset, length cycle} to implement the same function.

The look-up table 260 has two primary inputs. The first input is the output from one of the Holladay sequencers 210 or 220 that controls the sequencing into the brick that describes the halftone dot. The second input is the pixel value to be halftoned. Although shown with two inputs, it should be appreciated that the two inputs can be combined into a single memory address by a multi-bit latch (not shown) or equivalent logic circuitry. Using such circuitry, the sequencer output, as the most significant address bits, may be combined with the pixel value, as the least significant address bits, to produce the memory address.

Combining the sequencer and pixel data into an address in this manner takes advantage of performance gained with accessing dynamic memory. By placing the more rapidly changing pixel values in the lower address bits paired with the column address bits of the dynamic memory, fewer row accesses are required. Row accesses are slower in dynamic memory due to the precharge time required. In various exemplary embodiments of the systems and methods according to this invention, this performance improvement is taken advantage of, but is not limited to, the use of dynamic memory. Moreover, the values in the latching logic can be updated at a data rate at least as high as the rate that output pixels are to be generated. Data can be stored in the look-up table 260 such that the brick is replicated to a point where the ending point of the brick lies on an output boundary of the memory locations. If the output memory is x bits wide, (for example, for x-times addressability), then the ending point would preferably be on the x-bit boundary.

The data stored in the look-up table 260 also contains all combinations of thresholds for a given input pixel value. This is possible since the input pixel value is included in the address to the memory. Given a current pixel value and a current output state of one of the Holladay sequencers 210 and 220, the threshold decisions for multiple output pixels are thus determinable. Subsequently, during use, one access to the look-up table 260 can retrieve many output pixels, potentially from several scan lines. For example, eight output pixels (O.sub.n) can be retrieved at each access when outputting 8 bits from a single location in the look-up table 260.

Parallel continuous tone pixels can be implemented by replicating the portion of the output bits required to generate the halftone dot for that particular pixel. However, in various exemplary embodiments, the look-up table can be partitioned so that the look-up table location that is addressed by each continuous tone pixel contains the output pixels at the appropriate phase in the brick.

For some image processing applications, it may be desirable to use multiple halftone screens within a single scan line. It should be appreciated that this is not the same as storing multiple screens in memory, which merely requires a large address, such as, for example, a wider Holladay sequencer or alternatively bank switching. The key for enabling multiple halftone screens is that for each different screen, a Holladay sequencer, such as the Holladay sequencer 210 or 220, which generates the state for indexing into the halftone screen needs to operate to ensure that the phase of each dot is maintained across and between scanlines.

For each screen to be employed in a scanline, each Holladay sequencer needs to be run through the {offset, end, start, end . . . } sequence, but the output of only one Holladay sequencer would be passed on to the look-up table 260. To select the particular screen and the resulting dot, the address for the Holladay sequencer 210 or 220 associated with that screen/dot is forwarded on to the look-up table 260 by a multiplexer 230, as shown in FIG. 3. In this case, the select signal for the multiplexer 230 is used to enable the desired halftone screen pattern. At the same time, the other Holladay sequencers would be disconnected from the look-up table 260, but the states of all such other Holladay sequencers would be advanced to the next count of the sequence. In this way, the halftone screen can be selected on a pixel-by-pixel basis.

In various exemplary embodiments, an additional tag bit is used to select the desired screen. In various exemplary embodiments, to implement this feature, the count sequence in the fast scan direction is the least common multiple (LCM) of the set of lengths (L) for the bricks. In the slow scan direction, depending on the parameters for the shift (S) and the row (P), there may be a significant amount of replication. In effect, the least common multiple is used because the shifted brick starts at the beginning of the scanline for each screen. In these exemplary embodiments, significant increases in memory size may occur as, in general, each screen may be large and the least common multiple is even larger, by definition. Accordingly, this implementation is not as efficient in terms of memory usage.

With stochastic or super cell halftone screens, for example, the brick sizes often need an address of up to 24 bits. In various exemplary embodiments, the upper portion of the address generated by the Holladay sequencer 210 or 220, which does not change much on a pixel-by-pixel basis, is placed in the row address. The pixel value bits and less significant part of the address generated by the Holladay sequencer 210 or 220 are placed in the column address. At least a portion of the address generated by the Holladay sequencer 210 or 220 should be in the column address to reflect the change in the state of the halftone cell position.

As shown in FIG. 1, the Holladay bricks form a sequence 150 of identical rectangular image portions, such as the regions 152–162. As discussed above, a Holladay counter allows the rectangular image regions 152–162, defined by the three Holladay brick parameters, length L, height P, and shift S, to be sequenced. Each image region 152–162 can be viewed as having P rows and L columns. The columns correspond to pixels in a raster-ordered system, the rows correspond to scanlines and the shift parameter S is the offset amount of the rectangular image region at each repeat of P rows.

Figure 2:
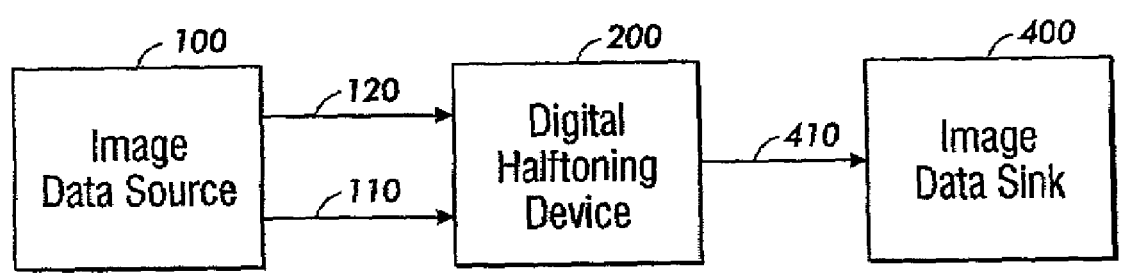
FIG. 2 is a block diagram of an exemplary embodiment of an image processing system that converts continuous tone image data to halftone image data according to this invention.

FIG. 2 is a generalized block diagram of an image forming system that includes a digital halftoning system 200 according to this invention. The digital halftoning system 200 inputs continuous tone image data and tag data from an image data source 100 and outputs halftone image data to an image data sink 400.

The image data source 100 can be any known or later developed device or system that is capable of providing continuous tone image data to the digital halftoning system 200. Similarly, the image data sink 400 can be any known or later developed device or system that is capable of receiving halftone image data output by the digital halftoning system 200 and either storing, transmitting, printing or displaying the halftone image data.

In general, the image data source 100 can be any one of a number of different sources, such as a scanner, a digital copier, a controller for a digital printing system, a facsimile device that is suitable for generating electronic image data, or a device suitable for storing and/or transmitting electronic image data, such as a client or server of a network, of the Internet, and especially the World Wide Web. For example, the image data source 100 can be a scanner, or a data carrier such as a magnetic storage disk, CD-ROM or the like, or a host computer, that contains continuous tone image data.

In general, the image data sink 400 can be any device that is capable of outputting or storing the halftone image data generated according to the systems and methods according to this invention, such as a printer, a copier or other image forming devices, a facsimile device, a display device, a memory, or the like.

The continuous tone input image data, along with the tag data, is provided by the image data source 100 to the digital halftoning system 200 through a pair of links 110 and 120. The tag data is digital data that provides information to the digital halftoning system 200 about the continuous tone image data on a per pixel basis. For example, in various exemplary embodiments, the tag data may denote that a pixel is of a particular image content type, such as text. In such exemplary embodiments, the tag data can represent many content types.

The processed halftone image data is provided from the digital halftoning system 200 to the image data sink 400 through a link 410. The links 110 and 410 can be any known or later developed devices, software utilities or systems for connecting the digital halftoning system 200 to the image data source 100 or to the image data sink 400, including direct cable connections, connections over a wide area network or a local area network, connections over an intranet or an extranet, connections over the Internet, or connections over any other known or later developed distributed processing network or system.

It should be appreciated that the image data source 100 and the link 110 can be integrated into the digital halftoning system 200 to form a single device without departing from the spirit and scope of the invention. Furthermore, the image data sink 400 and link 410 can also independently be integrated into the same physical device as the halftoning system 200 without departing from the spirit and scope of the invention.

FIG. 3 is a block diagram outlining one exemplary embodiment of the digital halftoning system 200 in greater detail. As shown in FIG. 3, the digital halftoning system 200 includes one or more of a stochastic Holladay counter 210, a clustered-dot Holladay counter 220, a multiplexer 230, a controller 240, an input interface 250, a look-up table 260, a data logic circuit 270 and an output interface 280. The links 110 and 120 are connected to the input interface 250, while the link 410 is connected to the output interface 280 respectively.

The input interface 250 receives continuous tone image data via the link 110 and provides the continuous tone image data to a look-up table 260 via the signal line 252. The controller 240 receives the tag data from the image data source 100 via the link 120. In various exemplary embodiments of the digital halftoning system 200, the bit depth of the continuous tone image data is eight bits. However, the continuous tone image data can have any desired bit depth without departing from the spirit and scope of this invention. Similarly, in various exemplary embodiments, the bit depth of the tag data is one bit. The tag data can have any desired bit depth without departing from the spirit of the invention.

While FIG. 3 shows the input interface 250 and the output interface 280 as two separate elements, it should be appreciated that the input interface 250 and output interface 280 can take the form of a single device capable of receiving continuous tone image data via the link 110 and the tag data, or more generally, control data, over the link 120, and outputting the generated halftone data via the link 410. It should be further appreciated that the links 110, 120 and 410 can also be a single device connecting the halftoning system 200 to the image data source 100 and to the image data sink 400.

In various exemplary embodiment, the controller 240 selects one of the two Holladay counters 210 or 220 by outputting a control signal based on the tag data over a control signal line 242 to a selector or multiplexer 230. The controller 240 also uses this tag data to generate a control signal that the controller 240 outputs over the signal line 241 to a control logic circuit 270. In the first exemplary embodiment of the halftoning system 200 shown in FIG. 2, since the tag data is used to select one of a pair of Holladay counters 210 or 220, the tag data has a bit depth of one.

The stochastic Holladay counter 210 and the clustered-dot Holladay counter 220 generate address sequences used to convert the contone image data to halftone image data. In this first exemplary embodiment, the Holladay counters 210 and 220 are designed to address the look-up table 260 using 10 bits of address data and provide one component of the address data for the look-up table 260. The other component of the address data for the look-up table 260 is provided by the continuous tone image data. The continuous tone image data is provided from the input interface 250 over a signal line 252. That is, the look-up table 260 receives the 10-bit address data from the multiplexer 230 via the signal line 232 and the continuous tone image data from the input interface 250 via the signal line 252. In various exemplary embodiments, the look-up table 260 is implemented using a memory having at least 18 address input lines and eight data output lines.

The stochastic Holladay counter 210 and the clustered dot Holladay counter 220 are identical implementations of a Holladay counter. These two Holladay counters 210 and 220 are identical in design in that they implement the Holladay counting sequence describe above with respect to FIG. 1. The clustered-dot Holladay counter 220 contains data usable to access an area of the look-up table 260 that contains the data specific to a cluster dot halftone screen. The stochastic Holladay counter contains data usable to access an area of the look-up table 260 that contains data specific to a stochastic halftone screen. The stochastic screen Holladay counter 210 contains an additional address bit that is usable to select which half of the data output from the look-up table 260 over the signal line 262 is replicated to obtain 4-times (4×) addressability.

Digital halftone threshold matrices can be represented by periodically repeating blocks. Furthermore, these periodically repeated blocks may be effectively rotated to a predetermined angle using the sequences produced by Holladay counters. Techniques for variable angle electronic halftone screening are disclosed in K. Knox, "Digital Halftoning Algorithms and Parameters", Proceedings of the International Conference on Lasers '90, pp. 619–625 and U.S. Pat. No. 4,149,194, each incorporated herein in its entirety.

The look-up table 260 can contain a number of halftone screens of various types and sizes. In this first exemplary embodiment, the look-up table 260 contains two halftone screens. The 10 bit address data references up to a 1024 locations in the look-up table 260. In various exemplary embodiments, each location in the look-up table 260 is eight bits wide. In general, 1024 locations can support up to a 32-by-32 cell, or any other rectangular cell size of the same area. Each eight-bit-wide location in the look-up table 260 can thus instantiate 8 thresholds of the halftone cell with a single address reference. It should also be noted that many halftone designs will fit into smaller cell sizes than 32-by-32. Thus, in various exemplary embodiments, the look-up table 260 can be used to hold many halftone screen designs. Each halftone screen can be stored in the look-up table 260 in a variety of formats depending on the desired resolution of the halftone screen. Generally, if the halftone screen is a clustered-dot halftone screen, then each 8-bit location in the look-up table 260 represents the results of comparing the input pixel with 8 threshold values used to represent one entry in the halftone screen.

However, stochastic halftone screens generally require less addressable resolution than clustered-dot halftone screens to produce a quality image. Accordingly, each 8 bit location in the look-up table 260 can contain several screen elements of lower resolution halftone image data. In this first exemplary embodiment of the look-up table 260, for the stochastic screen, each byte of data represents four 2-bit halftone image elements. By organizing data in this fashion and extracting multiple packed pixels from each byte, the look-up table 260 can produce each element for a stochastic halftone screen using 4-times (4×) addressability by packing four image elements into each byte.

Generally, the nature of the halftone screen, i.e., whether the halftone screen is a clustered-dot screen versus a stochastic screen, will determine whether a halftone screen contains packed data. However, it should be appreciated that whether image data is in a packed form is a design choice and not a requirement driven by the type of screen used. Thus, clustered-dot halftone screens can be packed and stochastic halftone screens are not necessarily packed. Any combination of screen types and packing formats can be used without departing from the spirit and scope of the invention.

For each address generated by the selected Holladay counter 210 or 220 and each word of continuous tone image data presented to the look-up table 260, the look-up table 260 will output a predetermined word of halftone image data.

In this first exemplary embodiment, the clustered-dot halftone screen stored in the look-up table 260 is not packed. Thus, in this first exemplary embodiment, if the controller 240 selects the clustered-dot Holladay counter 220, and the clustered-dot halftone screen, the digital logic circuit 270 will simply pass the halftone image output by the look-up table 260 to the output interface 280. However, the same technique that is used for stochastic screens can be used for clustered-dot or any other type of halftone screen that can be implemented with this look-up table approach. This invention can be used in a general way to enable different screen designs to have different addressability factors and efficiently share the resources of the look-up table 260.

While this first exemplary embodiment of the digital halftoning device 200 uses two Holladay counters 210 and 220, it should be appreciated that any number of Holladay counters that can be multiplexed to a single look-up table containing a respective number of halftone screens and processed accordingly may be used without departing from the spirit and scope of this invention. It should be further appreciated that, while this first exemplary embodiment produces high addressability halftone image data with an addressability eight times greater than the continuous tone input image data, the digital halftoning system 200 can produce halftone image data of any addressability without departing from the spirit and scope of the invention.

The control logic circuit 270 uses this control signal when modifying the data output from a look-up table 260. The logic circuit 270 receives the halftone image data from the look-up table 260 via the signal line 262 and the selection indicator and one control bit from the controller 240 via the signal line 241 based on the value of the tag data. The logic circuit 270 processes each word of halftone image data provided by the look-up table 260 according to whether the halftone screen contains packed data. If the halftone screen does not contain packed data, then the data logic circuit 270 simply passes the data unaltered to the output interface 280. If the halftone data is packed in the accessed location of the look-up table 260, the data logic circuit 270 extracts a portion of the data, replicates the extracted portion of data to form the halftone image data, and passes the halftone image data containing the replicated data to the output interface 280.

In this first exemplary embodiment of the digital halftoning system 200, the clustered-dot halftone screen in the look-up table 260 is not packed. However, since the stochastic halftone screen only requires four bits per element, the stochastic halftone screen has two pixel elements packed per 8-bit word. Thus, in this first exemplary embodiment, if the controller 240 selects the clustered-dot Holladay counter 220, and thus the clustered-dot halftone screen, the logic circuit 270 simply passes the halftone image data output by the look-up table 260 to the output interface 280. However, if the controller 240 selects the stochastic Holladay counter 210 and stochastic screen, then the logic circuit 270 will select four of the eight bits of the halftone image data output by the look-up table 260, then replicate each bit to form two 8-bit data words to be supplied to the output interface 280.

The logic circuit 270 outputs the halftone image data to the output interface circuit 280 over the signal line 272. The output interface circuit 280 then outputs the halftone image data over the link 410 to the image data sink 400.

In this first exemplary embodiment, the one bit tag data is used to select either the clustered dot screen or the stochastic screen based on the value of the one-bit tag data. When the clustered dot screen is selected for a particular continuous tone pixel, the controller 240 generates control signals that will select either the clustered dot Holladay counter 220 or the stochastic Holladay counter 210. When the clustered dot Holladay counter 220 is selected by the selector 230, the look-up table 260 is addressed using the output of the clustered dot Holladay counter 220 and the continuous tone data. The halftone image data output by the look-up table 260 is input by the logic circuit 270. The control signal from the controller 240 on the signal line 241 controls the logic circuit 270 so that the logic circuit 270 does not modify the halftone image data input from the look-up table 260. Thus, the logic circuit 270 merely transmits that data over the signal line 272 to the output interface 280 and ignores the control signal on the signal line 233. The data received by the output interface 280 is transmitted over the link 410 to the image data sink 400. When the value of the tag data selects the clustered dot, the halftone image data output over the link 410 is at an eight-times (8×) addressability, so that each output data bit state can be independently chosen. This results in finer control over the representation of the clustered dot at the image data sink 400 and allows the clustered dot design in the look-up table 260 to be improved.

When the value of the tag bit selects the stochastic screen, the halftone image data output by the look-up table 260 is determined by the upper 10 bits of the output of the stochastic Holladay counter 210 and the continuous tone image data. The halftone image data output by the look-up table 260 over the signal line 262 is input by the logic circuit 270. The control signal output by the controller 240 over the signal line 241 controls the logic circuit 270 so that the logic circuit 270 modifies the received halftone image data by replicating a portion the data when outputting the processed halftone image data to the output interface 280. In various exemplary embodiments, half of the 8-bit halftone image data is replicated, replacing the non-replicated 4 bits in the halftone image data output to the output interface 280. The control signal output over the signal line 233 is, in various exemplary embodiments, the lowest address bit of the stochastic Holladay counter that has been selected by selector 230. This control signal indicates which portion of the halftone image data is replicated by the logic circuit 270. The halftone image data output from the logic circuit 270 is transmitted by the output interface 280 over the link 410 to the image data sink 400.

For the value of the tag data that selects the stochastic screen, the output data transmitted over the link 410 is at a four-times (4×) addressability. Thus, the output data bit state can be independently chosen for only four bits. This results in courser control over the representation of the stochastic dot at the image data sink 400 and allows the memory requirements for the halftone data in the look-up table 260 for the stochastic screen to be reduced, resulting in a 50% savings of memory.

It should be appreciated that any size Holladay counter designed for a halftone screen of any given set of dimensions may be used without departing from the spirit and scope of the invention. It should be further appreciated that any number of Holladay counters with respective halftone screens can be used without departing from the spirit and scope of the invention.

Figure 4:
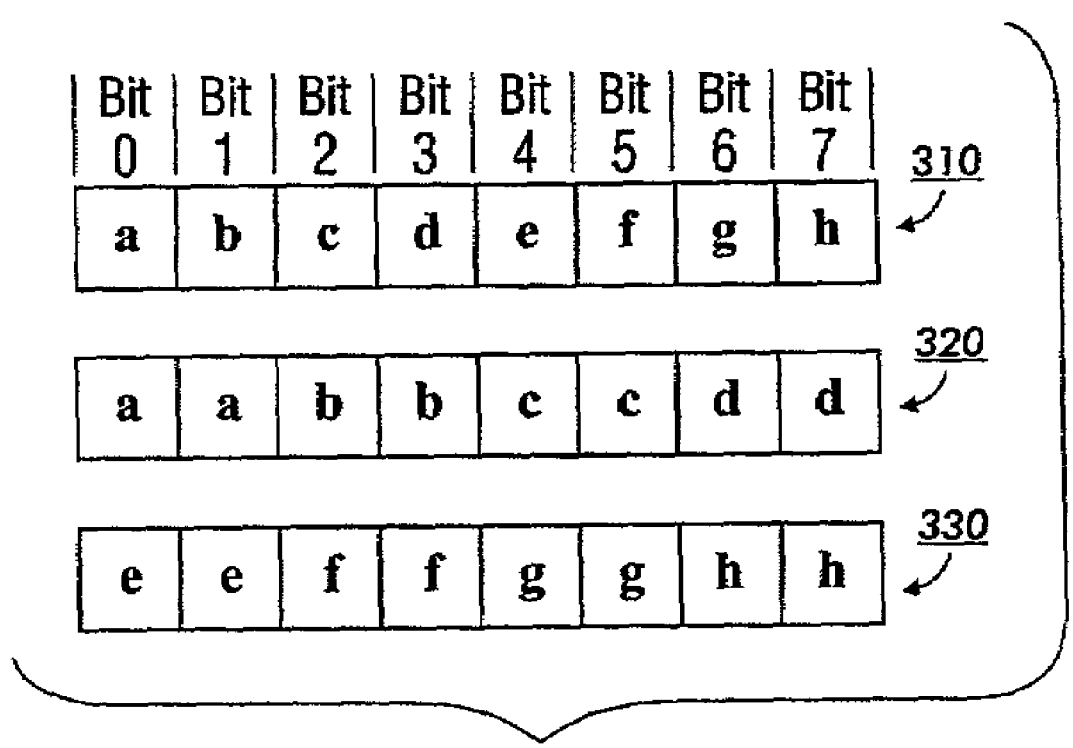
FIG. 4 is a block diagram showing one exemplary embodiment of a number of memory locations of the look-up table of FIG. 2.

When the stochastic screen is selected by the tag bit, and thus the halftone image data has only 4-times (4×) addressability, the logic circuit 270 samples the output of the look-up table 260 and replicates a portion of the output data, as shown in FIG. 4. As shown in FIG. 4, for the halftone image data 310 output by the look-up table 260, each bit is identified by a letter {a–h}. The logic circuit 270 outputs either the processed halftone image data byte 320 or the processed halftone image data byte 330 depending on the state of the control signal on the signal line 233. In various exemplary embodiments, this signal is the lower address bit of the stochastic Holladay counter 210.

As shown in FIG. 4, in the halftone image data byte 320, the first four bits of the halftone image data byte 310 are replicated by the logic circuit 270 on a bit-by-bit basis. In contrast, in the halftone image data byte 330, the last four bits of the halftone image data by the 310 are replicated by the logic circuit 270 on a bit-by-bit basis. For other addressability factors, the halftone image data output by the look-up table 260 is replicated by the logic circuit 270 in a similar manner to use the width of the data stored in the look-up table 260 to enable efficient use of the locations of the look-up table 260. In this way, the digital halftoning systems and methods according to this invention provide a unified design that can efficiently use the look-up table resources for different screen requirements.

In various exemplary embodiments of this invention, the digital halftoning system 200 produces high addressability halftone image data with an eight-times (8×) addressability. However, it should be appreciated that the digital halftoning system 200 can produce halftone image data at any addressability without departing from the spirit and scope of the invention.

While various exemplary embodiments of the digital halftoning system 200 uses 10-bit to 12-bit Holladay counters, it should be appreciated that any size Holladay counter designed for a halftone screen of any given set of dimensions may be used without departing from the spirit and scope of the invention. It should be further appreciated that any number of Holladay counters addressing respective halftone screens can be used without departing from the spirit and scope of the invention. Finally, it should be appreciated that Holladay counters of different sizes can be used together, with the extra address bits of the larger Holladay counters selecting pixels from packed bytes. For example, a 13-bit Holladay counter 210 can be used with twelve bits fed to the multiplexer 230 and the remaining bit fed to the logic circuit 270 to select one of two packed pixels in each byte provided by the look-up table 260.

In various exemplary embodiments, the controller 240 is a microprocessor. In other exemplary embodiments of this invention, the controller 240 can be a digital logic circuit, a switch, a memory device, or the like. It should be appreciated that the controller 240 can be any system or device capable of receiving control instructions via line 111 and otherwise providing control signals over the signal lines 243 and 244, a selection indicator over the signal line 242 and a control signals and address bits over the signal lines 241 without departing from the spirit and scope of this invention.

In the exemplary embodiment of the replication scheme shown in FIG. 4, each bit is replicated once. However, it should be appreciated that any replication scheme can be used without departing from the spirit and scope of this invention. Furthermore, while the exemplary embodiment of the replication scheme shown in FIG. 4 replicates each bit a–d or e–h serially, i.e., in a specific order, it should be appreciated that the replicated and original bits in the halftone image data bytes 320 and 330 can be output in any order in those bytes without departing from the spirit and scope of this invention.

Figure 5:
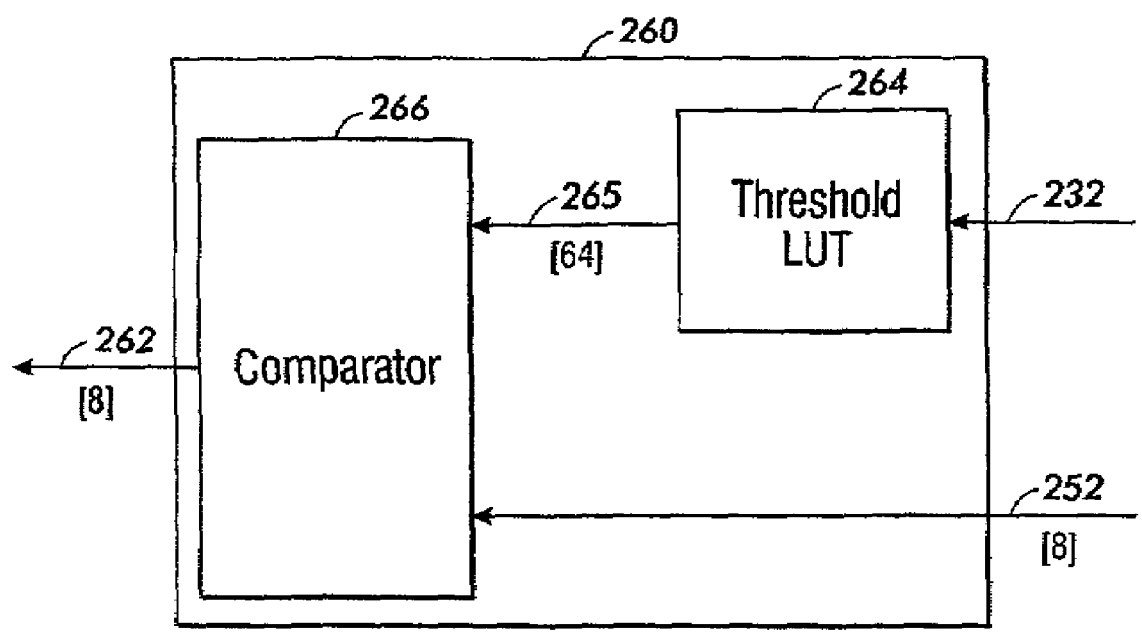
FIG. 5 is a block diagram showing in greater detail one exemplary embodiment of the look-up table of FIG. 1.

FIG. 5 is a block diagram outlining in greater detail one exemplary embodiment of the look-up table 260 of FIG. 3. As shown in FIG. 5, the look-up table 260 can be implemented using a threshold look-up table 264 and a comparator 266. In this exemplary embodiment, rather than storing precomputed thresholded binary data, the threshold look-up table 264 contains the threshold values. In the case of eight-times (8×) addressability, the output of the threshold look-up table 264 is 64 bits wide. The comparator 266 compares the continuous tone input image data for a particular pixel input from the input interface 250 over the signal line 252 to each of 8 different 8-bit threshold values output from the threshold look-up table 266. The halftone image data output by the comparator 266 is generally indistinguishable from the halftone image data output by the exemplary embodiment of the look-up table 260 described with respect to FIG. 3. The advantage of this exemplary embodiment is that, by not including the pixel value in the address data input to the look-up table 264, the address for the look-up table 264 requires less bits than the look-up table 260 described with respect to FIG. 3, and has fewer address locations. However, the width of the data output from the threshold look-up table 264 is wider than that of halftone image data output from the look-up table 260. It should be appreciated that, in the exemplary embodiment shown in FIG. 5, monotonic halftone dots are obtained. In contrast, in the exemplary embodiment shown in FIG. 3, any arbitrary progression between the active pixels in the different levels of the halftone dot can be implemented.

In operation, the look-up table 264 shown in FIG. 5 receives address bits from the selected one of the Holladay counters 210 and 220 over the signal line 232 and receives the continuous tone input image data over the signal line 252.

The threshold look-up table 264 receives the Holladay counter address data bits and outputs thresholded binary data based on the addressed location. The threshold look-up table 264 contains predetermined threshold binary data. In particular, the threshold look-up table 264 outputs eight 8-bit values. The look-up table 264 then outputs the 64-bit data to the comparator 266 over the signal line 265.

The comparator 266 receives the threshold data over the signal line 265 and the continuous tone input image data over the signal line 252, compares each of the eight 8-bit threshold values to each byte of the continuous tone input image data, and outputs an 8-bit halftone data signal over the signal line 262.

Figure 6:
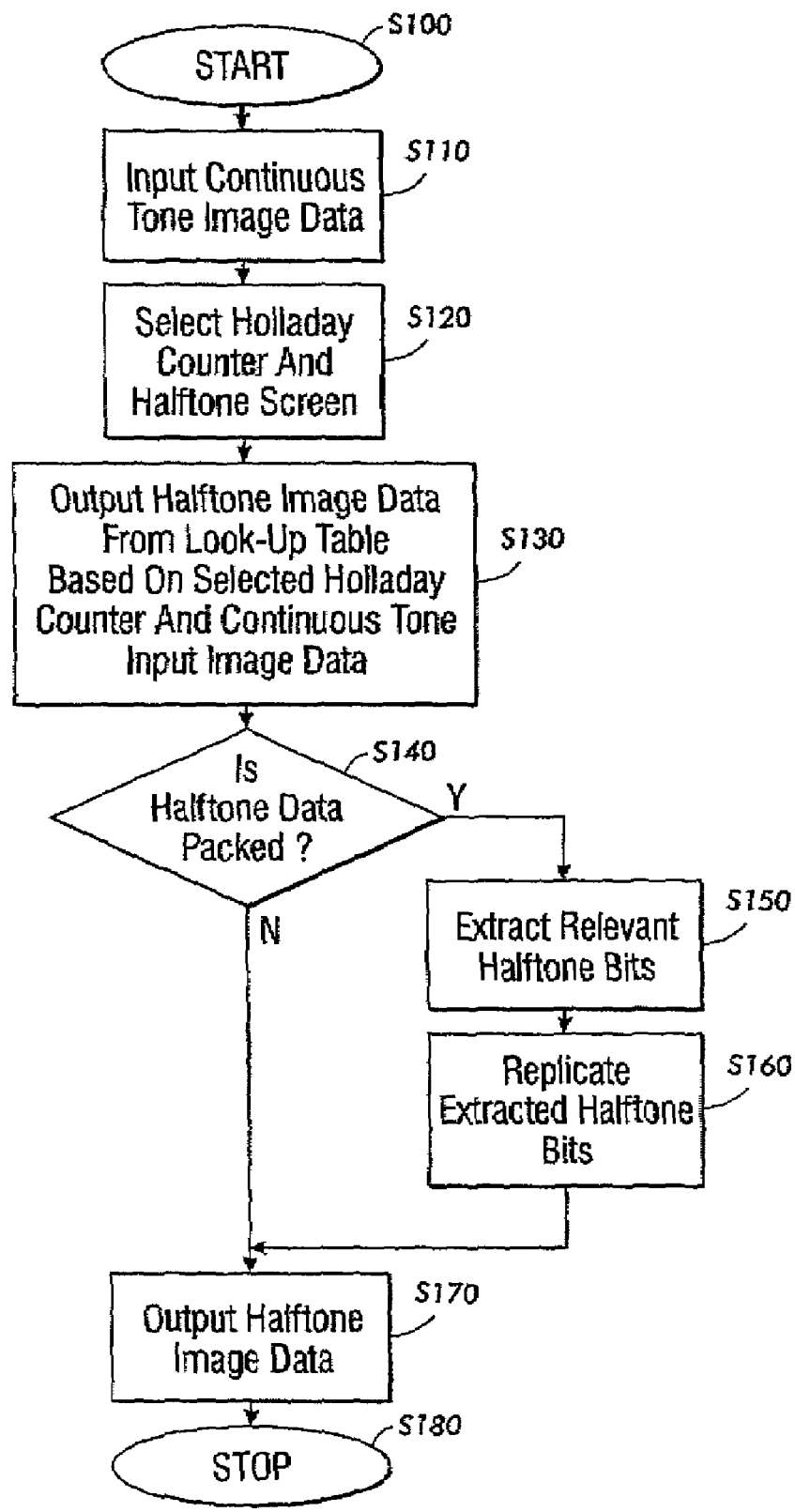
FIG. 6 is a flowchart outlining a first exemplary embodiment of a method for converting continuous tone image data to halftone image data according to this invention.

FIG. 6 is a flowchart outlining a first exemplary embodiment of a halftone data generating method according to this invention. Beginning at step S100, operation continues to step S110, where continuous tone image data is input. Then, in step S120, a Holladay counter is selected from a plurality of Holladay counters, along with a respective halftone screen, based on the input image data and/or tag data associated with the input image data. Next, in step S130, the continuous tone image data and the selected Holladay counter are used to address the selected screen to generate halftone data. Then, in step S140, a determination is made whether the generated halftone data is packed data. If the halftone image data is packed data, operation continues to step S150. Otherwise, operation jumps directly to step S170.

Generally, data is in packed form depending on the nature of the halftone screen selected. If the halftone screen is a clustered-dot halftone screen, then the halftone data is usually not packed. However, as stochastic halftone screens generally require less resolution that clustered-dot halftone screens, each byte of halftone data generated in step S130 can represent a plurality of halftone data values which can be packed into a single look-up table location. In various exemplary embodiments, each byte of data produced in step S130 can represent one byte of unpacked halftone image data or two or four sets of packed stochastic halftone image data. However, it should be appreciated that whether image data is in a packed form is a design choice and not a requirement driven by the type of screen used. Any combination of screen types and packing formats can be used without departing from the spirit and scope of the invention.

In step S150, because the halftone image data is packed, at least some of the bits are extracted from the packed data. Next, in step S160, the extracted bits are replicated. In various exemplary embodiments, for a first halftone screen, all bits can be selected and replicated. For example, eight bits representing two pixels can be replicated to produce two bytes of unpacked data. Alternatively, four bits can be extracted from each byte of data and replicated to produce a single 8-bit byte of halftone image data. Then, in step S170, the halftone image data is output. Operation then continues to step S180, where operation of the method stops.

Figure 7:
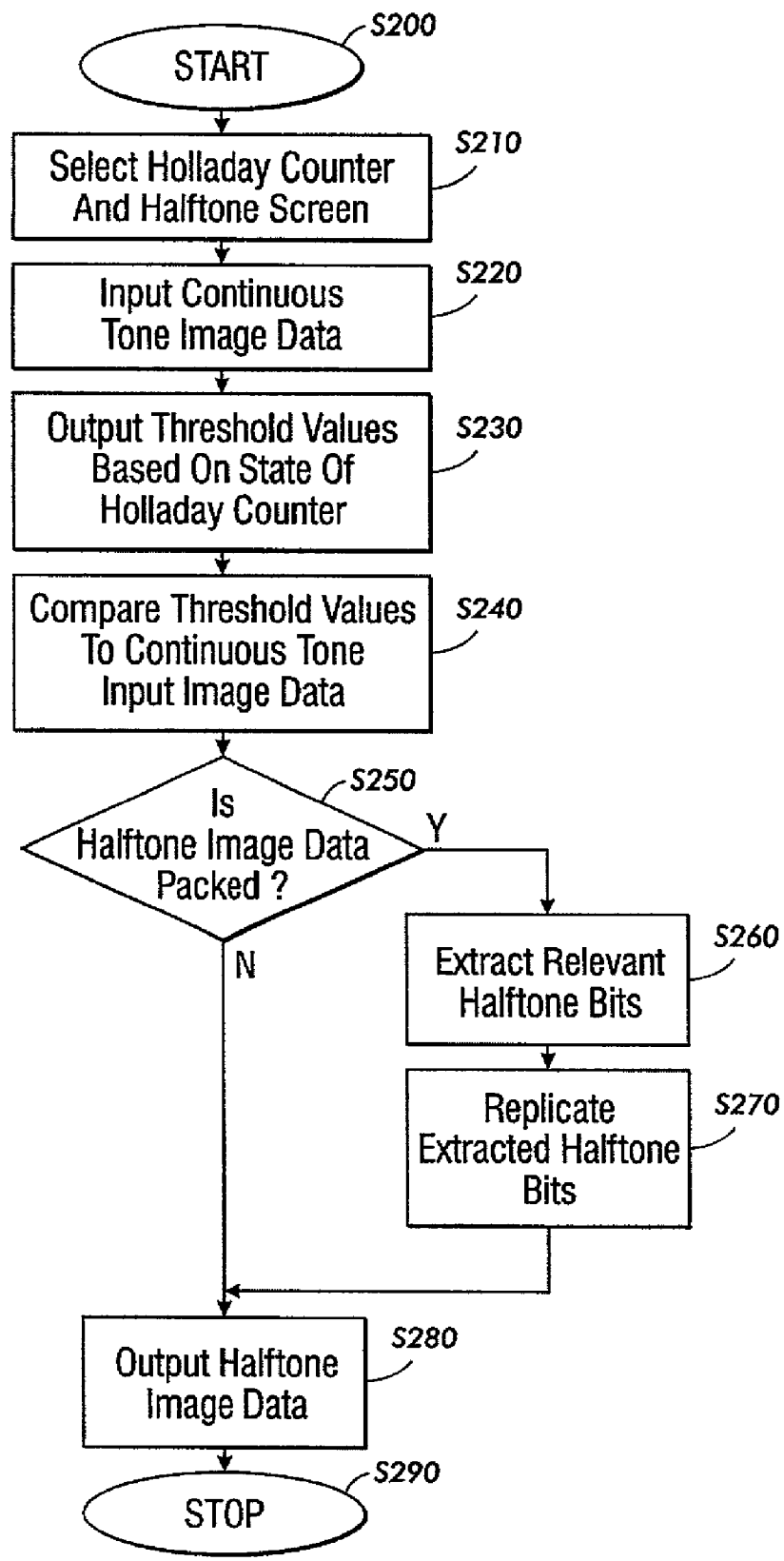
FIG. 7 is a flowchart outlining a second exemplary embodiment of a method for converting continuous tone image data to halftone image data according to this invention.

FIG. 7 is a flowchart outlining a second exemplary embodiment of the halftone data generating method according to this invention. Beginning in step S200, operation continues to step S210, where continuous tone image data is input. Next, in step S220, a Holladay counter and a respective halftone screen are selected. Then, in step S230, the selected Holladay counter is used to address the selected screen to select a set of halftone image data threshold values. Operation then continues to step S240.

In step S240, the selected set of halftone image data thresholds are compared to the continuous tone image data to produce the halftone image data. Then, in step S250, a determination is made whether the halftone image data is packed data. If the halftone image data is packed, operation continues to step S260. Otherwise, operation jumps directly to step S280.

In step S260, because the halftone image data is packed, at least a subset of the bits is extracted from the packed data. Next, in step S270, the extracted set of bits is replicated. where operation the extracted set of bits is replicated. In various exemplary embodiments, for a first halftone screen, all bits can be selected and replicated. For example, eight bits representing two pixels can be replicated to produce two bytes of unpacked data. Alternatively, for a second stochastic halftone screen, four bits can be extracted from each byte of data and each bit is replicated twice to produce a single 8-bit byte of halftone image data. Then, in step S280, the halftone image data is output. Operation then continues to step S290, where operation of the method stops.

In the exemplary embodiment of the digital halftoning system 200 shown in FIG. 3, the digital halftoning system 200 is shown using various discrete logic devices and memory devices. However, the digital halftoning system 200 can also be implemented on a general purpose computer, a special purpose computer, an ASIC or other integrated circuit, a digital signal processor, a hardwired electronic or logic circuit such as a discrete element circuit, programmable logic devices, such as PLD, PLA, FPGA or PAL, or the like. In general, any device, capable of implementing a finite state machine that is in turn capable of implementing the flowcharts of FIGS. 6 and 7 can be used to implement the digital processing system 200.

It should be understood that each of the circuits shown in FIGS. 3 and 5 can be implemented as portions of a suitably programmed general purpose computer. Alternatively, each of the circuits shown in FIGS. 3 and 5 can be implemented as physically distinct hardware circuits within an ASIC, or using an FPGA a PLD, a PLA or a PAL, or using discrete logic elements or discrete circuit elements. The particular form each of the circuits shown in FIGS. 3 and 5 will take is a design choice and will be obvious and predictable to those skilled in the art.

Moreover, the digital halftoning system 200 can be implemented as software executing on a programmed general purpose computer, a special purpose computer, a microprocessor or the like. In this case, the digital halftoning system 200 can be implemented as a routine embedded in a printer driver, as a resource residing on a server, or the like. The digital halftoning system 200 can also be implemented by physically incorporating it into a software and/or hardware system, such as the hardware and software systems of a printer.

Each of the look-up tables 260 and 264 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The links 110 and 410 can each be implemented using any known or later developed device or system for connecting the image data source 100 to the digital halftoning system 200, or the digital halftoning system 200 to the image data sink 400, respectively, including a direct cable connection, a connection over a wide area network or a local area network, a connection over an intranet, a connection over the Internet, or a connection over any other distributed processing network or system. In general, the link 110 can be any known or later developed connection system or structure usable to connect the image data source 100 to the digital halftoning system 200, or the digital halftoning system 200 to the image data sink 400, respectively.

In general, the image data source 100 can be any one of a number of different sources, such as a scanner, a digital copier, a facsimile device that is suitable for generating electronic image data, or a device suitable for storing and/or transmitting continuous tone electronic image data, such as a client or server of a network, or the Internet, and especially the World Wide Web. Similarly, the image data sink 400 can be any known or later developed device that is capable of receiving the halftone image data output by the digital halftoning system 200 and either storing, transmitting, or displaying the halftone image data.

Although the various exemplary embodiments of the systems and methods according to this invention are described above as processing continuous tone grayscale continuous tone image data, it should be understood that the systems and methods of this invention can be used with color images.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Accordingly, various changes may be made without departing from the spirit and scope of the invention.

What is claimed is:

1. A digital halftoning system that converts continuous tone image data to halftone image data, comprising:
    a plurality of Holladay counters including at least one stochastic counter and at least one clustered-dot counter;
    a selection circuit that selects one of the plurality of Holladay counters based on a selection indicator that corresponds to a characteristic of the continuous tone image data;
    a look-up table including at least one clustered-dot halftone screen and at least one stochastic halftone screen, wherein the look-up table outputs halftone image data based on a state of the selected Holladay counter and the continuous tone image data; and
    a digital logic circuit that receives the halftone image data, and that, based on the selected Holladay counter determines whether the halftone image data is packed, and if it is determined that the halftone image data is not packed, passes the halftone image data without changes and if it is determined that the halftone image data is packed, selects at least a portion of the halftone image data and replicates the selected portion of the halftone image data to produce replicated halftone image data.

2. The digital halftoning system of claim 1, wherein the look-up table outputs high addressability halftone image data having a spatial resolution that is greater than a spatial resolution of the continuous tone image data.

3. A digital halftoning system that converts continuous tone image data to halftone image data, comprising:
    a plurality of Holladay counters including at least one clustered dot counter and at least one stochastic counter;
    a selection circuit that selects one of the plurality of Holladay counters based on a selection indicator that corresponds to a characteristic of the continuous tone image data;
    a look-up table having a plurality of halftone screens including at least one clustered-dot halftone screen and at least one stochastic halftone screen, wherein the look-up table outputs a set of threshold values based on a state of the selected Holladay counter;
    a comparator that compares each of the threshold image values of the set from the look-up table to the continuous tone image data to produce halftone image data; and
    a digital logic circuit that replicates a portion of the produced halftone image data to produce replicated halftone image data when the stochastic counter is selected.

4. The digital halftoning system of claim 3, wherein the digital logic circuit replicates a portion of the produced halftone image data when the clustered dot counter is selected.

5. The digital halftoning system of claim 3, wherein the look-up table outputs high addressability halftone image data having a spatial resolution that is greater than a spatial resolution of the continuous tone image data.

6. A method for generating halftone data from continuous tone image data, comprising:
    selecting one of a plurality of types of Holladay counters, the plurality of types of Holladay counters including at least one clustered dot counter and at least one stochastic counter;
    outputting address bits from the selected Holladay counter; and
    outputting halftone image data from a look-up table based on at least the address bits from the selected Holladay counter and the continuous tone image data, wherein the look-up table includes at least one clustered-dot halftone screen and at least one stochastic halftone screen; and
    controllably processing the halftone image data by determining, based on the type of the selected Holladay counter, whether the halftone image data is packed, and if it is determined that the halftone image data is not packed, passing the halftone image data without processing the halftone image data, and if it is determined that the halftone image data is packed, selecting at least a portion of the halftone image data and replicating the selected portion of the halftone image data to produce replicated halftone image data.

7. The method of claim 6, wherein outputting halftone image data from the look-up table comprises outputting high addressability halftone image data having a spatial resolution that is greater than a spatial resolution of the continuous tone image data.

8. The method of claim 6, wherein, when the selected Holladay counter implements the clustered dot halftone screen, controllably processing the halftone image data comprises outputting the halftone image data without processing the halftone image data.

9. The method of claim 6, wherein, when the selected Holladay counter implements the stochastic halftone screen, controllably processing the halftone image data comprises replicating a portion of the halftone image data to produce replicated halftone image data.

10. A method for generating halftone data from anti-aliased image data comprising:
    selecting one of a plurality of Holladay counters;
    outputting address bits from the selected Holladay counter;
    outputting a set of threshold values from a look-up table based on at least the selected address bits, wherein the look-up table includes at least one clustered-dot halftone screen and at least one stochastic halftone screen;
    comparing each threshold value of the set from the look-up table to the continuous tone image data to produce halftone image data; and
    controllably processing the halftone image data by determining, based on the type of the selected Holladay counter, whether the halftone image data is packed, and if it is determined that the halftone image data is not packed, passing the halftone image data without processing the halftone image data, and if it is determined that the halftone image data is packed, selecting at least a portion of the halftone image data and replicating the selected portion of the halftone image data to produce replicated halftone image data.

11. The method of claim 10, wherein, when the selected Holladay counter implements the clustered dot halftone screen, controllably processing the halftone image data comprises outputting the halftone image data without processing the halftone image data.

12. The method of claim 10, wherein, when the selected Holladay counter implements the stochastic halftone screen, controllably processing the halftone image data comprises replicating a portion of the halftone image data to produce replicated halftone image data.

13. The method of claim 10, wherein outputting halftone image data from the look-up table comprises outputting high addressability halftone image data having a spatial resolution that is greater than a spatial resolution of the continuous tone image data.

* * * * *